June 18, 1963 T. R. HOFFMAN 3,094,686

GATING CIRCUITS UTILIZING FERROELECTRIC CAPACITORS

Filed Oct. 2, 1961 2 Sheets-Sheet 1

INVENTOR.
THOMAS D. HOFFMAN
BY William C. Cahill
ATTORNEY

INVENTOR.
THOMAS R. HOFFMAN
BY William C. Cahill
ATTORNEY

United States Patent Office 3,094,686
Patented June 18, 1963

3,094,686
GATING CIRCUITS UTILIZING FERROELECTRIC CAPACITORS

Thomas R. Hoffman, Schenectady, N.Y., assignor to General Electric Company, a corporation of New York
Filed Oct. 2, 1961, Ser. No. 142,085
6 Claims. (Cl. 340—173.2)

This invention relates to gating circuits and more particularly to gating circuits utilizing ferroelectric capacitors as the storage elements therein.

Gating circuits are those circuits which will provide an output indication only if certain predetermined input conditions exist. For example, a gate circuit may have a plurality of input channels and a single output channel, and will provide an output signal in the output channel if an input signal appears in any one of the input channels. Such a gate circuit may be termed an OR logic circuit. Also, a gate circuit may have a plurality of input channels and a single output channel and will provide an output signal only if an input signal appears in each of the input channels. Such a gate circuit may be termed an AND logic circuit. Such logic circuits are generally not concerned with the magnitude of the input signals but are instead concerned only with the occurrence or nonoccurrence of the input signals and will provide an output signal, usually in the form of a pulse, of a predetermined magnitude regardless of the magnitude of the input signals. Such circuits find extensive use today, especially in the computer field where they serve as the basic building blocks for most digital computers.

Capacitors are known which have rectangular voltage-charge characteristics such that the capacitor may retain a remanent charge even after all voltage has been removed from its terminals. This charge of the capacitor is retained as a polarization of the dielectric between the plates of the capacitor, rather than as surface charge on the plates of the capacitor. The capacitor may retain a charge of either polarity, with the retained polarity being dependent upon the polarity of voltage last applied to the capacitor. Such a capacitor is thus capable of two remanent states which may arbitrarily be designated first and second states, positive and negative states, "1" and "0" states or any other arbitrary designation. Such capacitors are called ferroelectric capacitors, so named because of the similarity of the voltage-charge characteristics of these capacitors with the current-flux characteristics of ferromagnetic materials. A barium titanate crystal is an example of a dielectric which may be used in these ferroelectric capacitors.

Because of the approximately rectangular voltage-charge characteristics of ferroelectric capacitors, once a charge of a given polarity, which may be termed a "saturating" charge, is established on such a capacitor, the application of any further voltage of that polarity does not change the charge, and thus does not cause any current flow through the ferroelectric capacitor. However, the application of a coercive voltage of the opposite polarity, that is a voltage whose magnitude is sufficient to switch the ferroelectric capacitor from one remanent state to the other, results in an electron flow sufficient to saturate the capacitor with the opposite polarity. The resultant electron flow may be used to provide a useful output signal.

Such capacitors offer several advantages over previously used storage or switching elements. A ferroelectric capacitor is physically small, and consumes no energy while storing a signal therein and the coercive voltage is small, and as such may be conveniently obtained from a transistor circuit. Also the hysteresis loop is not appreciably effected by temperature change below the Curie point of the dielectric material, which for barium titanate is 120° C., and thus the output pulse amplitude obtainable from such capacitors is not affected by temperature change below this temperature. Also, long time storage without regeneration is possible and, since stored information remains in a form of the polarization of the dielectric and not as a surface charge, the stored information is retained even if the electrodes are shorted together. Because of these characteristics, satisfactory operation of the capacitors is possible with pulses less than one microsecond in duration.

Accordingly, it is an object of the present invention to provide an improved gating circuit.

It is another object of this invention to provide gating circuits utilizing ferroelectric capacitors as the storage elements therein.

It is another object of this invention to provide an improved OR logic circuit utilizing ferroelectric capacitors.

It is yet another object of this invention to provide an improved AND logic circuit utilizing ferroelectric capacitors.

Briefly stated, in accordance with one embodiment of the invention, the gating circuit comprises an input and an output ferroelectric capacitor, each having an input and an output terminal, and a source of alternating voltage having alternate half cycles of opposite polarity. A first rectifier connects the source of alternating voltage to the input terminal of the input ferroelectric capacitor. This rectifier is poled such that one of the alternate half cycles, for example the negative alternate half cycle, will switch the input ferroelectric capacitor into one of its remanent states if the capacitor was previously in its other remanent state. These remanent states may be termed the first and second remanent states respectively. A second rectifier connects the source of alternating voltage to the input terminal of the output ferroelectric capacitor. This second rectifier is poled oppositely to the first rectifier, such that the other alternate half cycles will switch the output ferroelectric capacitor into its first remanent state if it were previously in its second remanent state. Input means are provided to switch the input ferroelectric capacitor into its second remanent state from its first remanent state whenever an input signal occurs. Means are also provided to connect the output terminal of the input ferroelectric capacitor to the input terminal of the output ferroelectric capacitor. An output circuit, which may be a parallel combination of a resistor and a conventional capacitor, is connected to the output terminal of the output ferroelectric capacitor.

The operation of the circuit is as follows: If no input signal has occurred during a preceding full cycle of the alternating source, both ferroelectric capacitors are in their first remanent state and since succeeding alternate half cycles from the alternating source do not switch either of the ferroelectric capacitors into a different remanent state, no charge flows through either capacitor and thus no current flows in the circuit. This may be termed the steady-state condition of the circuit. However, if an input signal occurs, the input ferroelectric capacitor is switched from its first to its second remanent state. The next negative half cycle switches the input ferroelectric capacitor back to its first remanent state, and transfers a saturating charge from the input ferroelectric capacitor to the output ferroelectric capacitor, thus switching the output ferroelectric capacitor into its second remanent state. The succeeding positive half cycle then switches the output ferroelectric capacitor to its first remanent state and causes a pulse to appear at the output terminal of the output ferroelectric capacitor.

For a complete understanding of the invention, a reference may be had to the accompanying figures in which.

Figure 1:
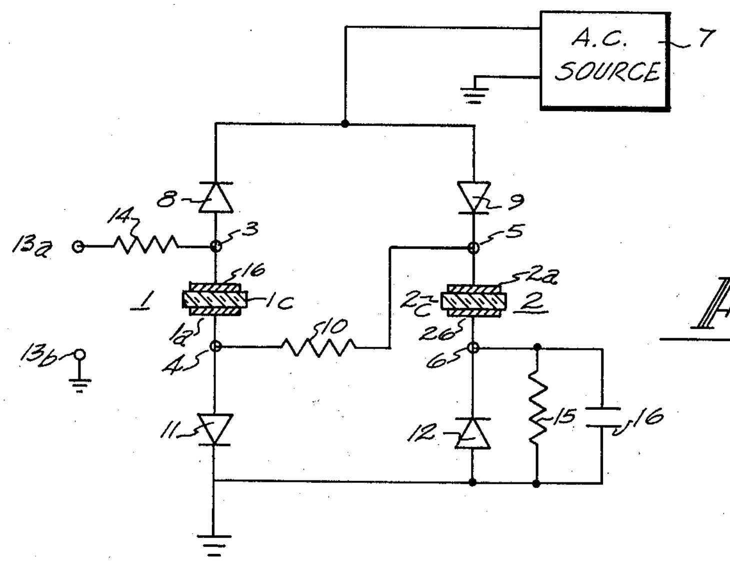
FIG. 1 is a circuit diagram of a gating circuit constructed in accordance with the invention.

The gating circuit of FIG. 1 includes an input ferroelectric capacitor 1 and an output ferroelectric capacitor 2. The input ferroelectric capacitor 1 comprises electrodes 1*a* and 1*b* and dielectric material 1*c* positioned between the electrodes. Output capacitor 2 comprises electrodes 2*a* and 2*b* and dielectric material 2*c* positioned between the electrodes. Dielectric material 1*c* and 2*c* comprises a material which exhibits a so-called ferroelectric effect and may be, for example, barium titanate.

Figure 2:
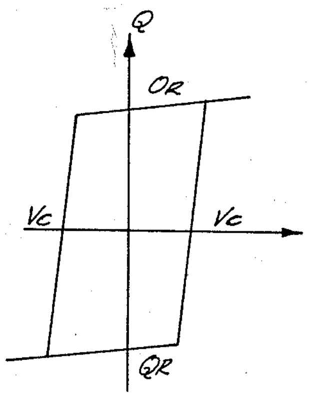
FIG. 2 shows the voltage-charge characteristics of a ferroelectric capacitor.

The operation of capacitors 1 and 2 may be better understood by reference to FIG. 2, which shows an idealized voltage-charge characteristic of a ferroelectric capacitor. The hysteresis loop of FIG. 2 may be considered to be a plot of the total charge Q which is passed through a ferroelectric capacitor as a function of the applied voltage producing the charge. The first time a voltage is applied to such a capacitor, before the dielectric material therein is polarized, the plot of charge against voltage may start at the origin; thereafter, a hysteresis loop would be followed. The value of voltage V across a capacitor at which the charge Q is zero is called the coercive voltage, $V_C$. The corresponding electric field within the capacitor is called the coercive field. The integrated charge value $Q_R$ which is in the capacitor when the voltage is returned to zero may be termed the remanent charge of the capacitor. This integrated charge value may be either positive or negative, depending upon the polarity of coercive voltage last impressed upon the ferroelectric capacitor. Thus, the capacitor has two remanent states and, once the dielectric material has been polarized, one electrode of the capacitor may be arbitrarily designated as "positive" with respect to the other when the voltage on the capacitor is zero, even though there is no actual electron charge on the electrodes of the ferroelectric capacitor at this time.

Referring again to FIG. 1, it is thus seen that each of the ferroelectric capacitors 1 and 2 is capable of two remanent states, which may be arbitrarily designated first and second remanent states. Input ferroelectric capacitor 1 may be arbitrarily said to be in its first remanent state when electrode 1*a* is "positive" with respect to electrode 1*b* and in its second remanent state when electrode 1*b* is "positive" with respect to electrode 1*a*. Likewise, output ferroelectric capacitor 2 may be said to be in its first remanent state when electrode 2*a* is "positive" with respect to electrode 2*b* and may be said to be in its second remanent state when electrode 2*b* is "positive" with respect to electrode 2*a*.

Still referring to FIG. 1, the input ferroelectric capacitor 1 has an input terminal 3 and an output terminal 4. Output ferroelectric capacitor 2 has an input terminal 5 and an output terminal 6. The circuit also includes a source of alternating voltage 7, with the output signal of the source 7 comprising alternating half cycles of a first and second polarity. Source 7 may have a sinusoidal output signal, a rectangular output signal or any other recurring signal wave form having alternate half cycles of opposite polarity. Diode 8 connects source 7 to the input terminal 3 of ferroelectric capacitor 1 and is poled to pass the first alternate half cycles of the output signal of the source 7. Diode 9 connects source 7 to the input terminal 5 of output ferroelectric capacitor 2 and is poled to pass the second alternate half cycles of the output signal of source 7. As shown in FIG. 1, diode 8 is poled to pass the negative half cycles from source 7 to the input terminal 3 of ferroelectric capacitor 1 and diode 9 is poled to pass the positive half cycles from source 7 to the input terminal 5 of output ferroelectric capacitor 2. Resistor 10 connects the output terminal 4 of capacitor 1 to the input terminal 5 of capacitor 2. Diode 11 connects output terminal 4 to ground, with the diode 11 being poled to pass current from terminal 4 to ground. Diode 12 connects output terminal 6 to ground, with diode 12 being poled to pass current from ground to terminal 6.

Terminals 13*a* and 13*b* are the input terminals for the circuit, with terminal 13*a* being connected to input terminal 3 of capacitor 1 through resistance 14 and terminal 13*b* being connected to ground. The output circuit comprises the parallel combination of resistor 15 and conventional capacitor 16, with the parallel combination being connected between output terminal 6 of capacitor 2 and ground.

The operation of the circuit may be explained as follows: Assume that no input signal occurs between input terminals 13*a* and 13*b*. The next full cycle of the output signal of source 7 assures that both ferroelectric capacitors 1 and 2 are in their first remanent state. For example, had ferroelectric capacitor 1 been in its second state at the beginning of the full cycle, the negative half cycle passes through diode 8 to capacitor 1 and causes electrode 1*a* to become positive with respect to electrode 1*b*, thus placing the capacitor 1 in its first remanent state. If ferroelectric capacitor 2 had been in its second remanent state at the beginning of the cycle, the postive half cycle passes through diode 9 and causes electrode 2*a* to become positive with respect to electrode 2*b*, thus placing ferroelectric capacitor 2 in its first remanent state. Thereafter, until the occurrence of an input signal, the charges on the capacitors 1 and 2 do not change and there is no current flow in the circuit and thus no signal in the output circuit. However, a positive going input signal applied between terminals 13*a* and 13*b* results in a current flow in the circuit, with a charge whose magnitude is $2Q_R$ passing through resistor 14, input ferroelectric capacitor 1 and diode 11; thus placing input ferroelectric capacitor 1 in its second remanent state. The succeeding negative half cycle of the output signal of source 7 switches input ferroelectric capacitor 1 back to its first remanent state and results in a charge transfer of magnitude $2Q_R$ passing through resistor 10 to the input terminal 5 of output ferroelectric capacitor 2, thereby switching capacitor 2 to its second remanent state. The path for this charge comprises diode 8, capacitor 1, resistor 10, capacitor 2 and diode 12. The succeeding positive half cycle of the output signal of source 7 then switches output ferroelectric capacitor 2 back to its first remanent state, with a charge equal in magnitude to $2Q_R$ flowing through diode 9, capacitor 2 and the output circuit which comprises resistor 15 and conventional capacitor 16. Thus, an output signal occurs when, and only when, an input signal occurs at input terminals 13*a* and 13*b*.

Of course, the polarity of diodes 8, 9, 11 and 12 could all be reversed, thereby causing the positive half cycles of the output of source 7 to be applied to capacitor 1 and the negative half cycles to capacitor 2. The input pulses to terminals 13*a* and 13*b* would then also have to be of opposite polarity, but the operation of the circuit would be the same.

Figure 3:
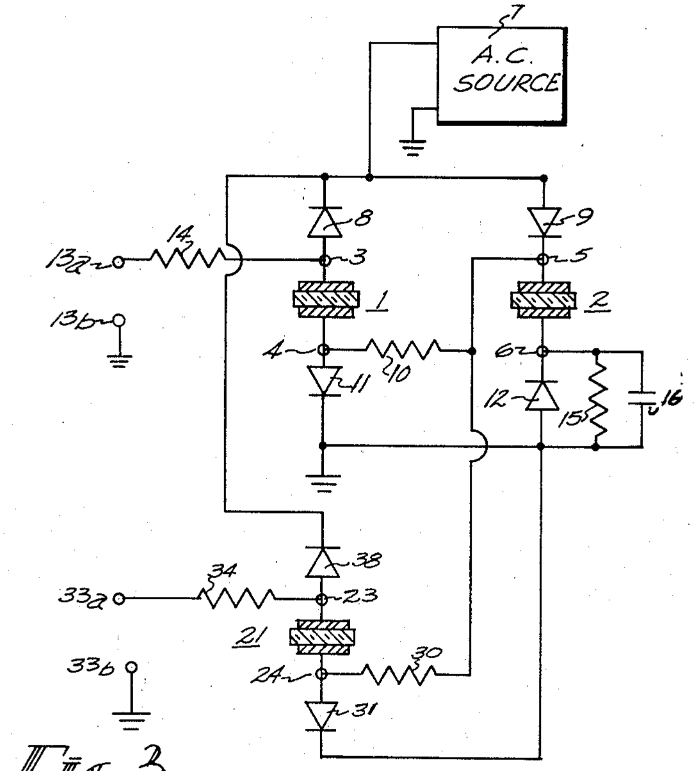
FIG. 3 is a circuit diagram of an OR logic circuit constructed in accordance with the invention.

In FIG. 3 is shown an OR logic circuit similar to the circuit of FIG. 1 with the addition of a second input ferroelectric capacitor 21 and its associated circuitry including diode 38 which connects input terminal 23 to the source 7 and diode 31 which connects the output terminal 24 to ground. The associated circuitry also includes input terminals 33*a* and 33*b*, with terminal 33*a* being connected to input terminal 23 through resistor 34 and terminal 33*b* being connected to ground. Resistor 30 connects output terminal 24 to the input terminal 5 of output ferroelectric capacitor 2.

The operation of the OR circuit may be explained as follows: Assume that no input signal occurs between either input terminals 13*a* and 13*b* or terminals 33*a* and 33*b*. Then the next full cycle of the output signal of source 7 assures that both input ferroelectric capacitors 1 and 21 and output ferroelectric capacitor 2 are in their first remanent state. For example, had ferroelectric capatcitor 1 been in its second state at the beginning of the full cycle, the negative half cycle passes through diode 8 to capacitor 1 and places the capacitor 1 in its first remanent state. In a similar manner the negative half cycle passes through diode 38 and places capacitor 21 in its first remanent state. If output capacitor 2 had been in its second remanent state at the beginning of the cycle, the positive half cycle passes through diode 9 and places ferroelectric capacitor 2 in its first remanent state. Thereafter, until the application of an input signal to one of the sets of input terminals, the charges on the capacitors 1, 21 and 2 do not change and there is no current flow in the circuit and thus no signal in the output circuit. However, a positive going input signal applied between terminals 13*a* and 13*b* results in a current flow in the circuit, with the charge whose magnitude is $2Q_R$ passing through resistor 14, input ferroelectric capacitor 1 and diode 11; thus placing input ferroelectric capacitor in its second remanent state. The succeeding negative half cycle of the output signal of source 7 switches input ferroelectric capacitor 1 back to its first remanent state and results in a charge transfer of magnitude $2Q_R$ passing through resistor 10 to the input terminal 5 of the output ferroelectric capacitor 2, thereby switching capacitor 2 to its second remanent state. The path for this charge comprises diode 8, capacitor 1, resistor 10, capacitor 2 and diode 12. The succeeding positive half cycle of the output signal of source 7 then switches output ferroelectric capacitor 2 back to is first remanent state, with a charge equal in magnitude to $2Q_R$ flowing through diode 9, capacitor 2 and the output circuit which comprises resistor 15 and conventional capacitor 16 connected in parallel. Thus, an output signal occurs when an input signal occurs at input terminals 13*a* and 13*b*.

A positive going input signal applied between terminals 33*a* and 33*b* also results in a current flow in the circuit, with a charge whose magnitude is $2Q_R$ passing through resistor 34, input ferroelectric capacitor 21 and diode 31; thus placing input ferroelectric capacitor 21 in its second remanent state. The succeeding negative half cycle of the output signal of source 7 switches input ferroelectric capacitor 21 back to its first remanent state and results in a charge transfer of magnitude $2Q_R$ passing through resistor 30 to the input terminal 5 of output ferroelectric capacitor 2, thereby switching capacitor 2 to its second remanent state. The path for this charge comprises diode 38, capacitor 21, resistor 30, capacitor 2 and diode 12. The succeeding positive half cycle in the output signal of source 7 switches output ferroelectric capacitor 2 back to its first remanent state, with a charge equal in magnitude to $2Q_R$ flowing through diode 9, capacitor 2 and the output circuit comprising resistor 15 and conventional capacitor 16. Thus, an output signal also occurs when an input signal occurs at input terminals 33*a* and 33*b*. The circuit thus performs the OR logic function.

As described above, FIG. 3 shows an OR logic circuit having two input channels which provides an output signal whenever a signal occurs in either input channel. Of course, a similar logic circuit could be provided having any desired number of input channels. Thus, it would be necessary only to provide an input ferroelectric capacitor and its associated circuitry for each desired channel connected in the same manner as the second input ferroelectric capacitor 21 of FIG. 3.

Figure 4:
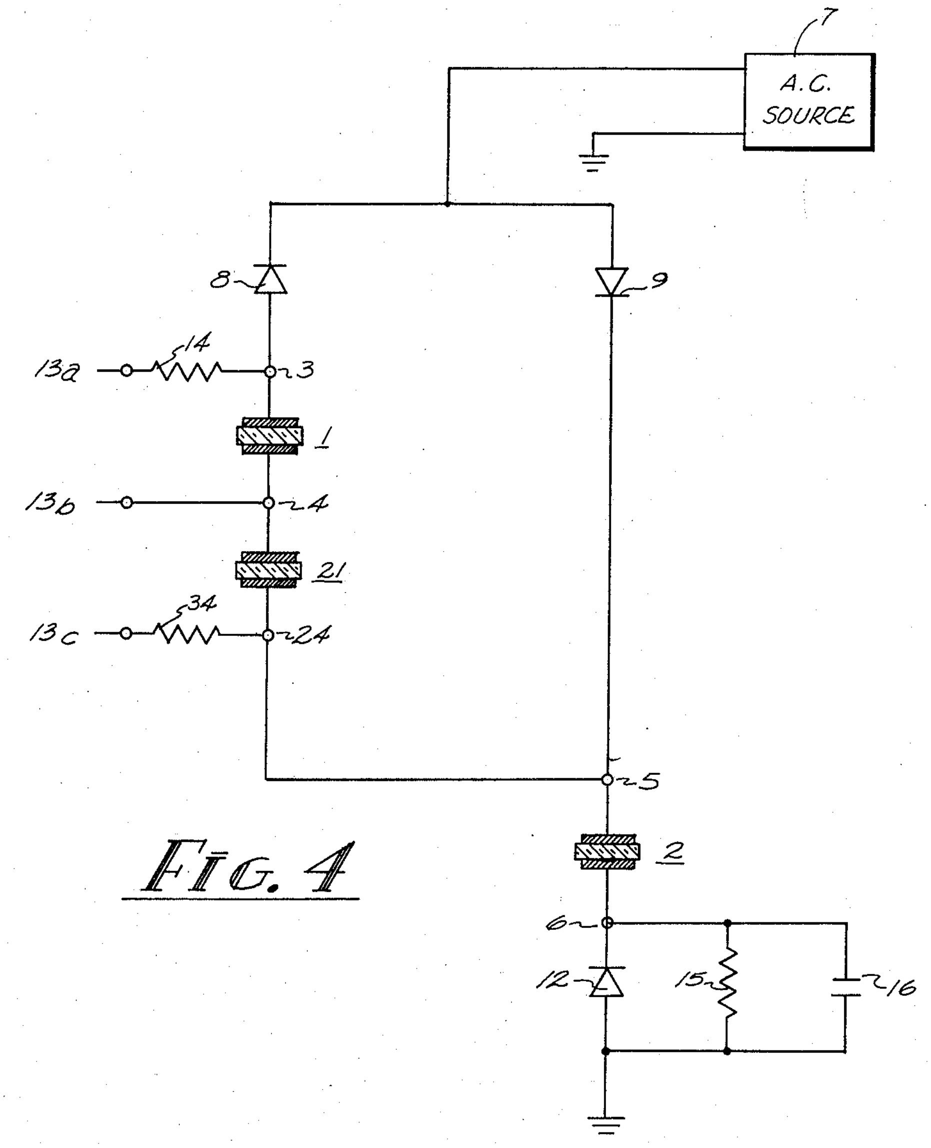
FIG. 4 is a circuit diagram of an AND logic circuit constructed in accordance with the invention.

In FIG. 4 is shown a circuit similar to that shown in FIG. 1, except that a second input ferroelectric capacitor 21 is added to provide an AND function. Now, however, the second input ferroelectric capacitor 21 is connected in series with the first input ferroelectric capacitor 1. Thus, the output terminal 4 of ferroelectric capacitor 1 also serves as the input terminal for ferroelectric capacitor 21 and the output terminal 24 of ferroelectric capacitor 21 is directly connected to the input terminal 5 of output ferroelectric capacitor 2. Terminals 13*a*, 13*b* and 13*c* are connected to terminals 3, 4 and 24 respectively, with terminal 13*a* being connected to terminal 3 through resistor 14 and terminal 13*c* being connected to terminal 24 through resistor 34.

The operation of this circuit is similar to that previously described except that it is necessary for both input capacitors 1 and 21 to be in their second remanent states before a negative half cycle from source 7 switches both to their first remanent state, thereby switching capacitor 2 to its second remanent state. If neither capacitor 1 nor capacitor 21 is in its second remanent state, or if only one of the capacitors 1 and 21 is in its second remanent state, whichever capacitor remains in its first remanent state blocks the negative half cycle from the source 7. However, when input capacitor 1 is switched from its first to its second remanent state by the occurrence of a positive going pulse applied between terminals 13*a* and 13*b* and input capacitor 21 is switched to its second remanent state by the occurrence of a positive going pulse between terminals 13*b* and 13*c*, the succeeding negative half cycle of the output signal of source 7 switches the capacitors 1 and 21 back to their first remanent state. This results in the transfer of a saturating charge from capacitors 1 and 21 to output capacitor 2 through terminal 5. The following positive half cycle of the output signal of source 7 is passed through diode 9 and switches diode capacitor 2 to its first remanent state, thereby causing a signal to appear in the output circuit comprising resistor 15 and conventional capacitor 16. Thus, it is necessary for positive going pulses to appear both between terminals 13*a* and 13*b* and terminals 13*b* and 13*c* in order to obtain an output signal from output ferroelectric capacitor 2. This circuit thus performs the AND logic function.

If a positive going input signal occurs in either of the input channels defined by terminals 13*a* and 13*b* and terminals 13*b* and 13*c* respectively but not in both channels, the subsequent negative half cycle of the output signal of source 7 does not switch the capacitor which has been placed in its second remanent state back to its first remanent state, due to the high impedance of the capacitor which remains in its first remanent state. Thus, one of the capacitors could remain in its second remanent state indefinitely until an input signal occurs in the input channel to the capacitor remaining in its first remanent state. Upon the occurrence of the second input signal switching the remaining input capacitor to its second remanent state, an output signal occurs in the output circuit in a manner previously described. Thus, the circuit may be used as an AND logic circuit in a system from which it is desired to have an output signal upon occurrence of simultaneous input signals or the circuit may be used in a system in which the input signals may occur at spaced time intervals and which it is desired to have an output signal subsequent to the occurrence of the final input signal.

In the circuit as shown in FIG. 4, it is necessary that either the output impedance of the source of input signals (not shown) or the resistors 14 and 34 be sufficiently high in value to prevent the negative half cycles from source 7 from switching output capacitor 2 into its second remanent state, thereby allowing the succeeding positive half cycles from the output of source 7 to provide an output signal.

Thus, an AND logic circuit is shown which has two input channels and which provides an output signal upon the occurrence of a signal in both of the input channels. Again, a similar circuit could be provided with any desired number of input channels, it being only necessary to provide as many input ferroelectric capacitors in the series circuit with capacitors 1 and 21 as is desired to have input channels. Such a circuit will provide an output indication only when an input signal occurs in each of the input channels.

While the principles of the invention have now been made clear in illustrative embodiments, there will be immediately obvious to those skilled in the art many modifications in structure, arrangement, proportions, the elements, materials and components, used in the practice of the invention, and otherwise, which are particularly adapted for specific environments and operating requirements, without departing from those principles. The appended claims are, therefore, meant to cover and embrace any such modifications, within the limits only of the true spirit and scope of the invention.

What is claimed as new and desired to secure by Letters Patent of the United States is:

1. A gating circuit comprising first and second ferroelectric capacitors each having first and second remanent states, a source of alternating voltage having first alternate half cycles of a first polarity and second alternate half cycles of a second polarity, first uniconductive means connecting said source to said first ferroelectric capacitor, second uniconductive means connecting said source to said second ferroelectric capacitor, said first and second uniconductive means being poled such that said first half cycles switch said first ferroelectric capacitor from its second to its first remanent state and said second half cycles switch said second ferroelectric capacitor from its second to its first remanent state, input means for placing said first ferroelectric capacitor in its second remanent state, means for switching said second ferroelectric capacitor from its first to its second remanent state in response to the switching of said first ferroelectric capacitor from its second to its first remanent state, and means for providing an output signal in response to the switching of said second ferroelectric capacitor from its second to its first remanent state.

2. A gating circuit comprising first and second ferroelectric capacitors each having first and second remanent states, a source of alternating voltage having first alternate half cycles of a first polarity and second alternate half cycles of a second polarity, a first rectifier connecting said source to said first ferrolectric capacitor, said first rectifier being poled such that said first alternate half cycles switch said first ferroelectric capacitor into its first remanent state, a second rectifier connecting said source to said second ferroelectric capacitor, said second rectifier being poled such that said second alternate half cycles switch said second ferroelectric capacitor into its first remanent state, input means for switching said first ferroelectric capacitor to its second remanent state, means connecting said first and second ferroelectric capacitors whereby said second ferroelectric capacitor is switched from its first to its second remanent state in response to said first ferroelectric capacitor being switched from its second to its first remanent state, and means for providing an output signal from said second ferroelectric capacitor in response to said second ferroelectric capacitor being switched from its second to its first remanent state.

3. An OR logic circuit comprising a plurality of input ferroelectric capacitors and an output ferroelectric capacitor, each of said ferroelectric capacitors having first and second remanent states, a source of alternating voltage having first alternate half cycles of a first polarity and second alternate half cycles of a second polarity, a rectifier associated with each one of said ferroelectric capacitors, respectively, each of the rectifiers associated with said input ferroelectric capacitors connecting its respective one of said input ferroelectric capacitors to said source and being poled such that said first alternate half cycles switch each of said input ferroelectric capacitors into its first remanent state, the rectifier associated with said output ferroelectric capacitor connecting said source to said output ferroelectric capacitor and being poled such that said second alternate half cycles switch said output ferroelectric capacitor into its first remanent state, a plurality of input means each associated with a respective one of said input ferroelectric capacitors for switching its associated input ferroelectric capacitor to its second remanent state, means connecting each of said input ferroelectric capacitors to said output ferroelectric capacitors whereby said output ferroelectric capacitor is switched from its first to its second remanent state in response to any one of said input ferroelectric capacitors being switched from its second to its first remanent state, and means for providing a signal from said output ferroelectric capacitor in response to said output ferroelectric capacitor being switched from its second to its first remanent state.

4. An OR logic circuit comprising two input ferroelectric capacitors and an output ferroelectric capacitor, each of said ferroelectric capacitors having first and second remanent states and each having an input and an output terminal, a source of alternating voltage having first alternate half cycles of a first polarity and second alternate half cycles of a second polarity, a rectifier associated with each of said ferroelectric capacitors, respectively, each of the rectifiers associated with said input ferroelectric capacitors connecting the input terminal of its respective one of said input ferroelectric capacitors to said source and being poled such that said first alternate half cycles switch said input ferroelectric capacitors into their first remanent states, the rectifier associated with said output ferroelectric capacitor connecting said source to the input terminal of said output ferroelectric capacitor and being poled such that said second alternate half cycle switch said output ferroelectric capacitor into its first remanent state, first input means connected to the input terminal of one of said input ferroelectric capacitors for switching said one input ferroelectric capacitor into its second remanent state in response to an input electric signal thereto, second input means connected to the input terminal of the other of said input ferroelectric capacitors for switching said other input ferroelectric capacitor into its second remanent state in response to an input electric signal thereto, means connecting the output terminal of each of said input ferroelectric capacitors to the input terminal of said output ferroelectric capacitor whereby said input ferroelectric capacitor is switched from its first to its second remanent state in response to either of said input ferroelectric capacitors being switched from its second to its first remanent state, and output means connected to the output terminal of said output ferroelectric capacitor for providing an electric signal in response to said output ferroelectric capacitor being switched from its second to its first remanent state.

5. An AND logic circuit comprising a plurality of input ferroelectric capacitors connected in a series circuit and an output ferroelectric capacitor, each of said ferroelectric capacitors having first and second remanent states, a source of alternating voltage having first alternate half cycles of a first polarity and second alternate half cycles of a second polarity, a first rectifier connecting said source to said series circuit, said first rectifier being poled such that said first alternate half cycles switch said input ferroelectric capacitors into their first remanent state, a second rectifier connecting said source to said output ferroelectric capacitor, said second rectifier being poled such that said second alternate half cycles switch said output ferroelectric capacitor into its first remanent state, a plurality of input means each associated with a respective one of said input ferroelectric capacitors for switching its associated input ferroelectric capacitor into its second remanent state, means connecting said series circuit to said output ferroelectric capacitor whereby said output ferroelectric capacitor is switched from its first to its second remanent state in response to all of said input ferroelectric capacitors being switched from their second to their first remanent state, and means for providing a signal from said output ferroelectric capacitor in response to said output ferroelectric capacitor being switched from its second to its first remanent state.

6. An AND logic circuit comprising two input ferroelectric capicitors and an output ferroelectric capacitor, each of said ferroelectric capacitors having first and second remanent states, means electrically connecting said input ferroelectric capacitors into a series circuit, a source of alternating voltage having first alternate half cycles of a first polarity and second alternate half cycles of a second polarity, a first rectifier connecting said source to said series circuit, said first rectifier being poled such that said first alternate half cycles switch said input ferroelectric capacitors into their first remanent states, a second rectifier connecting said source to said output ferroelectric capacitor, said second rectifier being poled such that said second alternate half cycles switch said output ferroelectric capacitor into its first remanent state, first input means connected to one of said input ferroelectric capacitors for switching said one input ferroelectric capacitor into its second remanent state in response to an input electric signal thereto, second input means connected to the other of said input ferroelectric capacitors for switching said other input ferroelectric capacitor into its second remanent state in response to an input electric signal thereto, means connecting said series circuit to said output ferroelectric capacitor whereby said output ferroelectric capacitor is switched from its first to its second remanent state in response to both of said input ferroelectric capacitors being switched from their second to their first remanent states, and means for providing a signal from said output ferroelectric capacitor in response to said output ferroelectric capacitor being switched from its second to its first remanent state.

No references cited.